United States Patent
Maegawa et al.

(10) Patent No.: US 8,423,333 B2
(45) Date of Patent: Apr. 16, 2013

(54) SYSTEM FOR MANAGING OBJECTS OF VIRTUAL SPACE

(75) Inventors: Hirotoshi Maegawa, Tokyo (JP); Hiroki Kato, Kanagawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1018 days.

(21) Appl. No.: 11/651,412

(22) Filed: Jan. 9, 2007

(65) Prior Publication Data
US 2007/0168168 A1 Jul. 19, 2007

(30) Foreign Application Priority Data

Jan. 16, 2006 (JP) .................................. 2006-007963
Jan. 16, 2006 (JP) .................................. 2006-007964

(51) Int. Cl.
*G06F 17/50* (2006.01)

(52) U.S. Cl.
USPC ............................................................ 703/6

(58) Field of Classification Search ........................ 703/6
See application file for complete search history.

(56) References Cited

U.S. PATENT DOCUMENTS

| | | | | |
|---|---|---|---|---|
| 5,963,731 A * | 10/1999 | Sagawa et al. | ..................... | 703/6 |
| 6,054,995 A * | 4/2000 | Allen et al. | ................... | 345/619 |
| 6,219,045 B1 * | 4/2001 | Leahy et al. | ................... | 715/757 |
| 7,927,217 B2 | 4/2011 | Kimura | | |
| 2003/0114226 A1 | 6/2003 | Kimura | | |
| 2005/0278158 A1 * | 12/2005 | Ellison et al. | ..................... | 703/6 |
| 2007/0054716 A1 | 3/2007 | Hiruta | | |
| 2007/0238523 A1 | 10/2007 | Kim | | |

FOREIGN PATENT DOCUMENTS

| | | |
|---|---|---|
| JP | 2003-6127 | 1/2003 |
| JP | 2003-181146 | 7/2003 |
| JP | 2004-105671 | 4/2004 |
| JP | 2007-98063 | 4/2007 |
| WO | 01/57678 | 8/2001 |

OTHER PUBLICATIONS

Craig W. Reynolds, "Flocks, Herds, and Schools: A Distributed Behavioral Model" Computer Graphics, vol. 21, No. 4, Jul. 1987, pp. 25-34.*

Robert McDermott, "Modelling Hoplight Battle in Swarm", Massey University, Nov. 2004, 83 pages.*

Lihua Wang, Stephan John Turner, Fang Wang, "Resolving Mutually Exclusive Interactions in Agent Based Distributed Simulations" Proceedings of the 2004 Winter Simulations Conference, pp. 783-791.*

Masaru Aoyagi, Akira Namatame, "Massive individual based simulation: forming and reforming of flocking behaviors" Complexity International, 2005, pp. 1-5.*

(Continued)

*Primary Examiner* — Dwin M Craig
(74) *Attorney, Agent, or Firm* — Katten Muchin Rosenman LLP

(57) ABSTRACT

A simulator system containing a plurality of individual simulators to simulate behavior of a predetermined simulation target, where: individual simulators select the simulation target satisfying a predetermined notification condition among simulation targets to send the information related thereto to an intercommunication control apparatus; and an intercommunication control apparatus executes the processing of the content determined according to a condition related to this notified simulation target to notify the result of the execution to individual simulators.

15 Claims, 6 Drawing Sheets

OTHER PUBLICATIONS

Japanese Office Action dated Mar. 18, 2008, with partial translation, from the corresponding Japanese Application.

"Inside Windows" Jul. 1, 1998, vol. 4, No. 7, pp. 90-102, Softbank, Inc.

Japanese Office Action dated Nov. 15, 2011, from corresponding Japanese Application No. 2006-007963.

Itsutsubashi Research Co., Ltd. "On-site UNIX engineer talks about: Topic No. 1 'Inside Online Game'", Linux Japan, vol. 5, No. 3, Mar. 1, 2002, pp. 41-51.

"Hierarchical Character Management for Computer-Generated Crowd" IPSJ SIG Technical Report, vol. 98, No. 112, Dec. 10, 1998, pp. 7-12.

* cited by examiner

| KEY | PROCESSING TO BE EXECUTED |
|---|---|
| INDIVIDUAL SIMULATOR 3b | PREDATION JUDGMENT PROCESSING |
| INDIVIDUAL SIMULATOR 3c | |
| ⋮ | ⋮ |

SYSTEM FOR MANAGING OBJECTS OF VIRTUAL SPACE

CROSS-REFERENCE TO RELATED APPLICATIONS

The priority application Nos. JP 2005-7963 and JP 2005-7964 upon which this patent application is based are hereby incorporated by reference.

BACKGROUND OF THE INVENTION

1. Field of the Invention

The present invention relates to a simulator system for simulating behavior of a plurality of kinds of interacting objects.

2. Description of the Related Arts

In recent years, a device for providing a virtual reality-like scenes, in which the user enters a virtual world, has been developed.

For example, such devices simulate moving objects such as birds and fish in a virtual space to provide information on visible objects such as the birds and the fish from the user objects operated by the user to a device at a user side.

However, in such devices providing such conventional virtual reality, a case of predation of the fish by the birds and the case of occurrence of an interaction between objects different in kind from each other, which is exemplified by a left-turn vehicle stopped while a pedestrian passes through a crossing, a positional relation between individual objects should be always monitored, resulting in a larger processing load. In addition, in the case where individual simulators are allocated to each kind of object for distributed processing, sending and receiving the information about the objects between individual simulators becomes complicated.

When an operation of moving the user objects and a simulation of moving other objects are operated by different computer elements, a communication of the position of each object should be carried out for each frame between individual computer elements. Hence, according to an increase in the number of objects, a communication load increases resulting in an increase in the processing load in this aspect.

SUMMARY OF THE INVENTION

The present invention was created in view of the situation as described and one of its aims is to provide a simulator system capable of reducing the processing load and the communication load.

The present invention for solving the problem of the conventional example as described above is a simulator system and contains a plurality of individual simulators to simulate behavior of a predetermined simulation target. Here, individual simulators select the simulation target satisfying predetermined notification conditions among simulation targets as described above to send the information related to the selected simulation target to an intercommunication control device. Alternatively, the individual simulators provide the information about the simulation target to the user terminal for each synchronization timing determined on the basis of a predetermined timing determination rule.

Selectively sending the simulation target related to the notification condition to other individual simulators enables a reduction in the processing load and the communication load in individual simulators. In addition, eliminating a necessity of synchronizing information such as the position of objects between all individual simulators by the user terminal for each step of simulation enables a reduction in the processing load and the communication load in individual simulators.

DESCRIPTION OF THE PREFERRED EMBODIMENT

Figure 1:
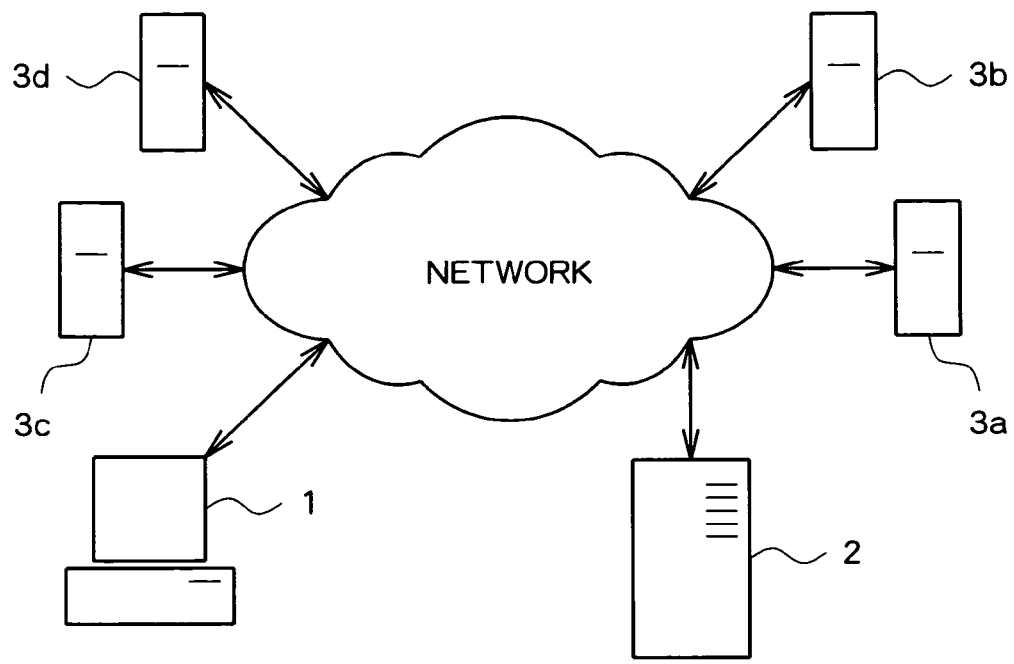
FIG. 1 is a block diagram of a simulation system according to an embodiment of the present invention.

The embodiment of the present invention will be described below with reference to the drawings. The simulation system according to the first embodiment of the present invention includes, as shown in FIG. 1, a user terminal 1, an intercommunication control apparatus 2, and a plurality of individual simulators 3. These units are connected to each other via a network.

In the following sections, an example of a user moving in a virtual municipal space is assumed for convenience of the description. This municipal space contains one or more user objects, one or more vehicle objects as objects other than users, one or more building objects, one or more pond objects, one or more road objects, one or more bird objects, and one or more fish objects distributed in ponds in a city.

On the other hand, each of these objects is assumed to be moving in a predetermined region in a municipal space. For example, user objects are humans and designated as capable of moving near the ground in the virtual municipal space on and in terrestrial parts such as a sidewalk, a pedestrian crossing, or a park in the city. In addition, vehicle objects are designated as movable on a roadway near the ground. Furthermore, bird objects are designated as movable in a range of a region upward from the ground and up to a predetermined depth in the pond excluding deep sections of the pond in the virtual municipal space. Fish objects are designated as movable in the pond. On the other hand, building, pond, and road objects are defined as not movable. For unmovable objects, information related to their positions is held by user terminal 1 and individual simulators 3.

User terminal 1 can be achieved by using a common personal computer. This user terminal 1 manages the user objects as described later.

Each of the individual simulators 3 manages objects of particular a kind. For example, the first individual simulator 3a simulates a moving vehicle object, the second individual simulator 3b simulates a moving bird object, and the third individual simulator 3c simulates a moving fish object.

Figure 2:
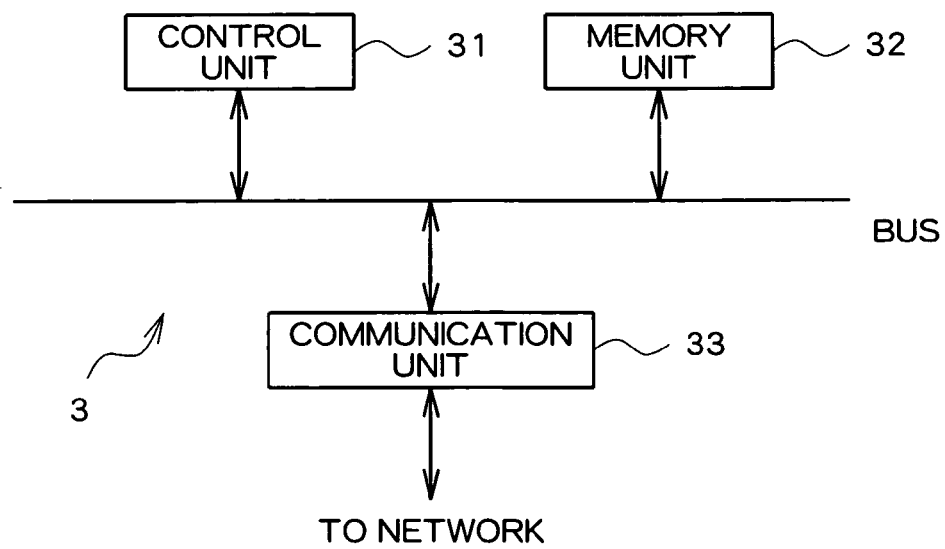
FIG. 2 is a block diagram showing an example of a constitution of individual simulators according to the embodiment of the present invention.

Each of the individual simulators 3 is, for example, a server computer and, as shown exemplarily in FIG. 2, includes a control unit 31, memory unit 32, and communication unit 33. Here, the control unit 31 is a program controllable device such as CPU and operates according to a program stored in memory unit 32. This control unit 31 works as a simulator for at least one moving object. In addition, the control unit 31 selectively notifies information of objects, which satisfy a predetermined condition (notification condition), among objects as simulation targets, to the intercommunication control apparatus 2. This processing will be described later in detail.

In addition, this control unit 31 carries out the processing of sending a list of objects contained in the designated region (object search processing).

The memory unit 32 is a memory device. This memory unit 32 stores a program related to each processing executed by the control units 31 as described above. On the other hand, this memory unit 32 stores parameter information, etc., used in each processing. Moreover, the memory unit 32 also operates as a work memory for a control unit 31.

The communication unit 33 is a network interface and sends out the designated information for the designated address via the network according to the designation inputted from control unit 31. Further, this communication unit 33 outputs information received via the network to control unit 31.

Figures 3, 4:
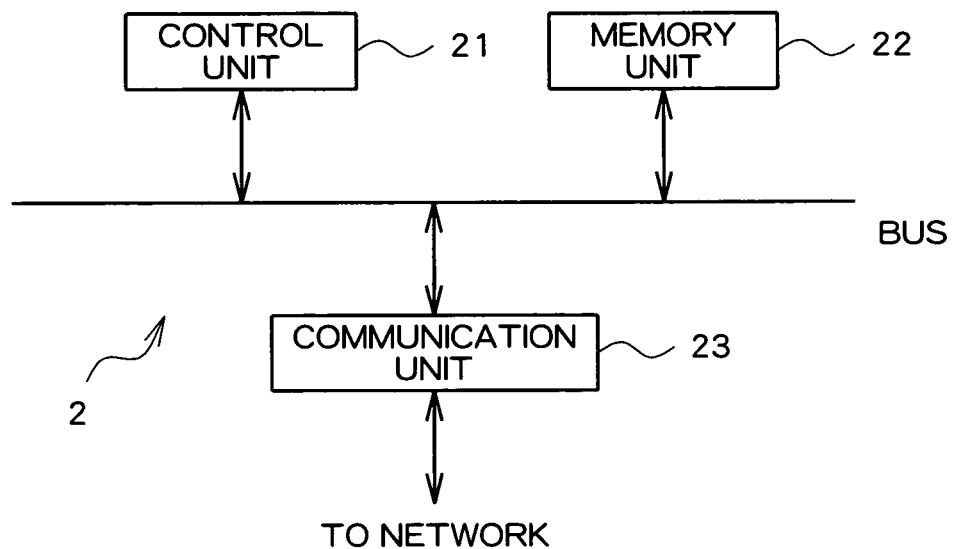
FIG. 3 is a block diagram showing an example of a constitution of an intercommunication control device according to the embodiment of the present invention.
FIG. 4 is a graphical illustration showing an example of content of a dependence relation database according to the embodiment of the present invention.

The intercommunication control apparatus 2 is achieved by the server computer or the like. The intercommunication control apparatus 2 includes a control unit 21, memory unit 22, and a communication unit 23 as shown in FIG. 3. Here, the control unit 21 is the CPU, etc., and operates according to the program stored in the memory unit 22.

The memory unit 22 includes the memory device and stores the program related to each processing. Further, the memory unit 22 stores parameter information used for the processing in the control units 21. The memory unit 22 also operates also as a work memory of the control unit 21.

The communication unit 23 is the network interface and sends out the designated information for the designated address via the network according to the designation inputted from the control unit 21. Further, this communication unit 23 outputs the information received via the network to the control unit 21.

The simulator system according to the present embodiment has the constitution as described above and, as shown in FIG. 5, is functionally constituted by: a user object management unit 41, a user's visual field display unit 42, an intercommunication control device 51, search processing unit 52, dependence judgment unit 53, collision judgment unit 54, dependence database 55, simulation engine unit 61, object data memory unit 62, and notification judgment unit 63.

Here, the user management unit 41 and the user's visual field display unit 42 are in the user terminal 1. The intercommunication control device 51, search processing unit 52, dependence judgment unit 53, collision judgment unit 54, and dependence database 55 are in the intercommunication control apparatus 2. The simulation engine unit 61, object data memory unit 62, and notification judgment unit 63 are in each individual simulator 3.

The user object management unit 41 accepts operations of moving the user objects by the user. Then this user object management unit 41 updates the position of the user objects in the virtual space. Here, in a moving operation by the user, the user terminal 1 restricts the user's operation to prevent the user's objects from moving outside of the region predetermined as movable. For example, when an operation directing moving from the sidewalk to the roadway is carried out, whether or not the roadway part is a pedestrian crossing is judged, and if it is not a pedestrian crossing, the user's operation is ignored and no moving operation of the user objects is carried out.

The user's visual field display unit 42 transmits the information defining the user's visual field to the intercommunication control apparatus 2. Then, the user's visual field display unit 42 receives the information of other objects contained in the visual field range from the intercommunication control apparatus 2 to display an image based on the received information on a display, etc.

On receiving the notification of the object information from individual simulators 3, the intercommunication control device 51 stores the notified object information and the kind of objects (or, information identifying individual simulators 3 that sent the notification) in a related manner. The intercommunication control device 51 stores the notified object information and the kind of objects (or, information identifying individual simulators 3 that sent the notification) in the memory unit 22 as the notification database.

The search processing unit 52 makes each of the individual simulators carry out the object search processing according to the designation received from a user terminal 1. Then, the search processing unit 52 obtains the information of objects belonging to the user's visual field from each of the individual simulators. The search processing unit 52 then sends out the obtained object information.

The dependence judgment unit 53 refers to the notification database stored in the memory unit 22 and dependence database 55. Then, when the processing to be executed is defined in dependence database 55, the dependence judgment unit 53 outputs the designation to start the execution of the defined processing (for example, a collision judgment processing).

The collision judgment unit 54 receives the designation to start the execution of the collision judgment processing from dependence judgment unit 53. The collision judgment unit 54 then refers to the notification database stored in the memory unit 22 to judge whether or not to carry out the simulation in consideration of the mutual action between different kinds of objects. Then, when it is judged necessary to carry out the simulation in consideration of the mutual action, the collision judgment unit 54 outputs information related to the objects as the target of the mutual action to individual simulators 3 managing each of the objects related to the mutual action and requests execution of the processing related to the mutual action.

According to the present embodiment, a mutual processing execution device is achieved by the dependence judgment unit 53 and the collision judgment unit 54.

The dependence database 55 is stored in the memory unit 22 as a holding device. An example of this dependence database 55 contains, as shown in FIG. 4, information that concerns at least one kind of object (or information identifying individual simulators 3 each managing the at least one piece of information) R1, R2, ..., and the information P identifying the content of the processing to be executed, in a related manner.

The simulation engine unit 61 in individual simulators 3 each simulates the behavior (for example, movement) of objects as the target of the simulation. Here, the simulation engine unit 61 attaches an object identifier to each of the objects as the targets of the simulation and computes by simulating the position of moved objects after each predetermined period of time (1 step) according to a predetermined rule. Then, the simulation engine unit 61 stores in the object database the information about the simulation, such as the computed moved position, and the identifier of each object, in a related manner.

For example, movement of bird objects and fish objects is carried out by the processing to simulate the behavior of groups. As a specific example, the simulation is conducted on the basis of simulation parameter information such as gathering easiness, dispersing easiness, position of the object on which the birds or fish center, and the position of the object from which the birds or fish flee. Here, the object on which the birds or fish center is an object as a target to which the birds or fish want to become closer. For example, for the birds, the fish are examples of objects on which the birds center. This is because for birds, fish are a target of predation. On the other hand, the object from which the birds or fish flee is an object which the birds or fish keep away from. For example, for fish, the birds are examples of objects from which fish flee. This is because for fish, the birds are predators. In the processing to simulate such behavior of the groups, their simulation parameter information is used for computing the moved position of the individual object belonging to the group in the next step.

In addition, this simulation engine unit 61 executes the processing related to the behavior other than the movement defined according to the kind of managed object. For example, for the bird objects, the processing to be executed is about whether or not the bird eats the fish object in a predetermined range of distance from the bird.

Moreover, on receiving the direction in which to execute the processing related to the mutual action from the collision judgment unit 54, the simulation engine unit 61 continues the simulation processing using the object information received along with the direction.

For example, the simulation engine unit 61 for simulating the movement of the fish objects receives the positional information about the bird objects as the objects from which the fish flee. The positional information of the bird objects is the information related to the object as the target of the mutual action. Then, the simulation engine unit 61 defines the received positional information of bird objects as the positional information of the object from which the fish flee to continue the simulation of the fish objects.

Object data memory unit 62 stores and holds the positional information of each object as individual simulation target in memory unit 22.

The notification judgment unit 63 achieves a selection notification device. If the managed objects satisfy a given notification condition, the notification judgment unit 63 sends the object information which satisfies a notification condition to the intercommunication control apparatus 2 (notification processing). Here, the notification conditions are stored in the memory unit 33 as the parameter information. One of the notification conditions is, for example, used as the condition related to a locality region of objects in the virtual space. As a specific example, for the bird objects, the following condition is determined: the notification target is the object located in the region which is (1) a range of the pond having a predation target, and (2) has a height less than a predetermined height over the ground. In other words, the region is recognized as the region in which the birds can hunt fish, as predation targets, in the pond.

Next, the example of the operation of the simulation system according to the present embodiment will be described below. In the following example of the operation, description will be given for the example in which individual simulator 3a to simulate the movement of the vehicle objects, individual simulator 3b to simulate the movement of the bird objects, and individual simulator 3c to simulate the movement of the fish objects are connected to each other via the network and manage, as a whole, the object in the virtual municipal space.

In this example, there are no mutual actions between birds and vehicles, and between fishes and vehicles. However, a virtual relation is defined between birds and fish because birds prey on fish. For setting this predation relation, the notification condition is defined that birds that enter the region are allowed to prey on fish, for example, the bird objects which are over the pond or in the pond, and are in a region with a height less than a predetermined height over the ground, become the notification target. The notification condition is defined in the memory unit 32 of an individual simulator 3b to simulate the movement of the bird objects.

On the other hand, concerning the fish objects, the notification condition is defined as: the notification target is fish objects located in the region from the surface of the pond to a predetermined depth D. This notification condition is stored in the memory unit 32 of an individual simulator 3c to simulate the movement of the fish object.

Vehicle objects occasionally carry out mutual actions (i.e., collision) between human objects such as user objects. However, in the example here, the movable range of human objects is restricted to only the sidewalk or the pedestrian crossing and the movable range of vehicle objects is restricted to only the roadway. Therefore, the mutual action between human objects and vehicle objects is restricted to the pedestrian crossing, which is the region where the movable ranges of various kinds of objects cross.

Then, in an individual simulator 3a managing vehicle objects, the notification condition is defined as: vehicle objects entering the pedestrian crossing are assigned to the notification target. Similarly, in a computer system managing human objects, the notification condition is defined as: human objects entering the pedestrian crossing are assigned to the notification target. In other words, here, definition is made that the notification is carried out for the user terminal 1 when the user objects enter the pedestrian crossing.

In addition, in the dependence database 55 of the intercommunication control apparatus 2, as exemplarily shown in FIG. 4, a dependence entry is defined by relating to key information. The key information here includes information identifying an individual simulator 3b managing bird objects and information identifying an individual simulator 3c managing fish objects. On the other hand, the dependence entry is processing designation information to designate the processing to be executed. Here, for example, it is the processing designation information concerning sending the information of the notified (i.e. stored in the notification database) fish objects to an individual simulator 3b to execute the processing of judging whether to prey or not. As follows, for distinguishing, the entry of a dependence relationship between birds and fish is named "predation-related entry."

Figure 6:
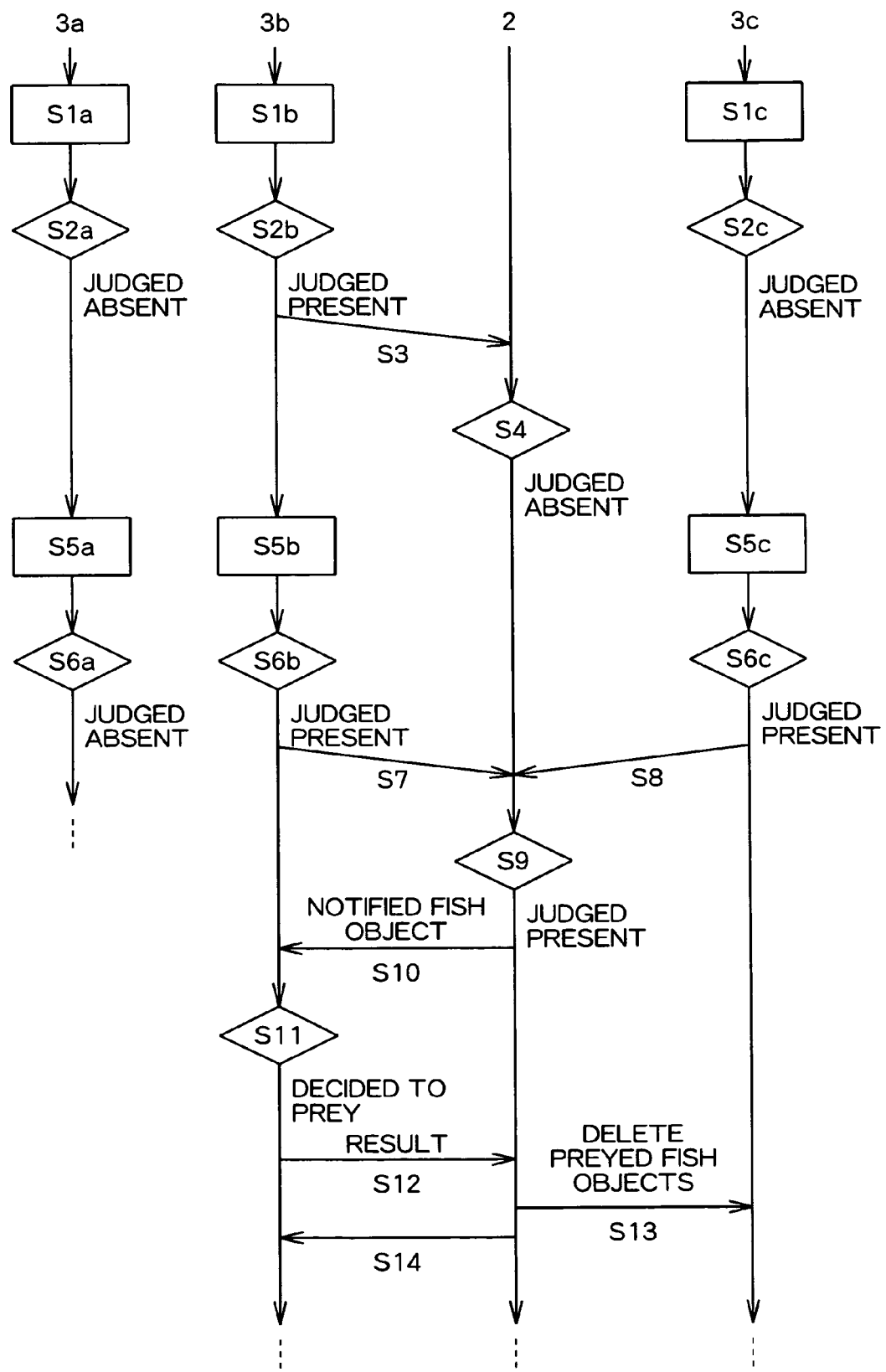
FIG. 6 is a flow chart showing an operation example of the simulation system according to the embodiment of the present invention.

In this operational example, as shown in FIG. 6, each of individual simulators 3a, 3b, and 3c carries out the behavior simulation using a predetermined algorithm for the kinds of objects, which are assigned to these simulators for simulation, to sequentially change the moving position of each object (S1*a*, S1*b*, and S1*c*). For example, in an individual simulator 3b assigned to bird objects, the algorithm (a basic algorithm is exemplified by Reynolds, C. W. (1987) Flocks, Herds, and Schools: A Distributed Behavioral Model, in Computer Graphics, 21 (4) (SIGGRAPH '87 Conference Proceedings) pages 25-34) for simulating the group is used to simulate a situation of flying bird objects in the virtual municipal space.

In processing this movement, each of the individual simulators 3 judges whether or not there is an object which satisfies the defined notification condition, among a plurality of objects assigned to the simulation target (S2a, S2b, and S2c). For example, an individual simulator 3b managing the bird objects examines whether or not there are one or more bird objects (notification target) which are defined as the notification condition moved to the region over the pond or in the pond, and that are in a region with a height less than the predetermined height over the ground. When one or more bird objects are found as the notification target, individual simulator 3b sends and notifies the predetermined information, such as the positional information of the bird objects as the notification target, to the intercommunication control apparatus 2 as the information of the bird objects as the notification target (S3).

The intercommunication control device 51 in the intercommunication control apparatus 2 receives the notified information and stores the notification database, which is made by relating the information identifying individual simulator 3b with the notified information, in the memory unit 22.

Then, the dependence judgment unit 53 in the intercommunication control apparatus 2 refers to the dependence database 55 stored in the memory unit 22 and reads out the key information of each entry of the dependence relationship defined in the dependence database 55. The dependence judgment unit 53 then refers to the notification database to examine whether or not the notification has been carried out by all the individual simulators 3 contained in the read key information. By this step, whether or not the processing to be executed is defined in dependence database 55 is judged (S4).

The step of this example is in the state where no notification of the fish objects has been received from individual simulator 3c managing fish objects. In other words, there is no fish object in the region from a surface of the pond to a depth D on the basis of the judgment of the current status of the behavioral simulation of the fish object in the individual simulator 3c. Therefore, the notification database has only information identifying an individual simulator 3b related to the bird objects. Thus, it is judged that no notification from each of the individual simulators 3b and 3c included in the key of the predation-related entry, which is defined in dependence database 55, has been carried out, and so processing 31 is returned to and the simulation is executed in the next step. At this time, the intercommunication control apparatus 2 deletes the notification database from the memory unit 22.

Each of the individual simulators 3 again executes the processing of the movement in the next step (S5) and judges whether or not there is an object, which satisfies the defined notification condition, among objects (generally plural) as the target of simulation (S6). Here, when it is assumed that there is at least one the bird object as the notification target, an individual simulator 3b sends information, such as information on the position of the bird objects, of the bird objects as the notification target as the notification target to intercommunication control apparatus 2 for notification again (S7).

Here, it is assumed that an individual simulator 3c managing fish objects finds the fish objects moved in the range from the surface of the pond to the defined depth D. In this case, individual simulator 3c assigns the fish objects to the notification target and sends, for example, the information (the identifier of each fish object) for identifying the fish objects as the notification target and the information thereof as the information of the fish objects to the intercommunication control apparatus 2 (S8).

The intercommunication control device 51 in the intercommunication control apparatus 2 receives the notification from individual simulator 3b and individual simulator 3c. Then, the intercommunication control device 51 receives the notified information and stores the notification database, which is made by relating the information identifying individual simulator 3b and 3c with the information notified from each of them, in the memory unit 22.

Then, the dependence judgment unit 53 in the intercommunication control apparatus 2 judges whether or not the processing to be executed is defined in the dependence database 55 (S9). In this processing step S9, the dependence database 55 holds the information identifying both individual simulators 3b and 3c in the notification database. Then, the dependence judgment unit 53 judges that the information identifying all the individual simulators 3, which is contained in the key of the predation-related entry, is stored in the notification database. Subsequently, the predation processing related to the key is executed by the collision judgment unit 54. As already described, here, the information of the fish objects stored in the notification database is sent to individual simulators 3b to be subjected to the judgment, as to whether or not the fish objects are preyed upon, by individual simulators 3b (S10).

The simulation engine unit 61 in individual simulators 3 judges whether or not the birds as the notification target show the behavior of preying on the fish objects, which is received from the intercommunication control apparatus 2 (S11). This judgment is performed according to a random number or a predetermined parameter (for example, hunger parameter) for the simulation. Then, the simulation engine unit 61 sends the result of this judgment to the intercommunication control apparatus 2 (S12). For example, if it is assumed that predation is carried out, the identifiers of the hunted fish objects are sent to intercommunication control apparatus 2. On the contrary, if it is assumed that predation is not carried out, information representing this fact is sent to intercommunication control apparatus 2.

Moreover, the collision judgment unit 54 in the intercommunication control apparatus 2 informs the result of the processing related to dependence relationship to individual simulators 3. Here, whether or not the predation was carried out is examined from the received information of the result of the judgment. If the predation was carried out, the identifiers of the hunted fish objects are send out to an individual simulator 3c to delete the fish objects, which are identified by the identifiers, from an object database (S13). The intercommunication control apparatus 2 sends the information, in which the fish objects regarded as being hunted among fish objects as the notification target disappeared, to an individual simulator 3b (S14).

Subsequently, each of the individual simulators 3 executes repeatedly starting from the simulation processing of the behavior of objects managed thereby.

According to the present embodiment, an individual simulator 3b managing the bird objects and individual simulator 3c managing fish objects never receive the information related to other objects unless objects managed thereby enter the predetermined range defined as the range capable of carrying out the mutual action in the virtual space. In conclusion, this step reduces the opportunity of executing the simulation processing of the mutual action resulting in reduction of the load of the simulation processing.

On the other hand, as shown in FIG. 6, no sending and receiving of the information is carried out between objects (between vehicles and fish, and between vehicles and birds) having no defined mutual action. In other words, if there are bird objects as the notification object, no information about the bird objects is sent to the individual simulator 3a simulating the behavior of the vehicle objects. This can reduce a communication load.

Here, it is assumed that on each occasion of executing the simulation of the behavior of each object, the notification database is deleted and the notification database is updated by receiving a new notification. However, when a change occurs in the notification object previously notified in each of individual simulators and the notification object to be notified at this time, the change (information about the objects to be added to the notification database and information about the objects to be deleted from the notification database) may be notified to intercommunication control apparatus 2. In this way, while there is no change of the notification object, the notification is not required every time, resulting in reduction of the communication load.

Here, the example is described for the case where the notification condition is previously defined in each of individual simulators 3. However, the notification condition may not be previously defined, as described below.

For example, in the example as described above, the information of the depth D defining the notification objects is previously defined in the individual simulator 3c managing the fish objects. However, this information of the depth D may be initially such that D=0, namely, the fish objects located on the water surface are assigned to the notification target. If D=0 is defined as described above, as a rule, the condition having no designation of the notification occurs (because the fish objects do not move to the region of D=0). Then, it is possible that when the specified individual simulator 3 makes the notification, the intercommunication control apparatus 2 will define the information of the depth D as D=d (d>0) in the individual simulator 3c, and then request to notify the fish objects located in the range up to the depth D.

As a result, in this case, the information specifying the individual simulator 3b which manages the bird objects is assigned to the key and the next entry of the dependence relationship related to this key is stored in dependence database 55. In conclusion, the entry of the dependence relationship is the entry of the dependence relationship (hereinafter called, for discrimination, a depth defining entry), in which setting is made as the processing of defining the information of the depth D as D=d (d<0) by the individual simulator 3c related to the fish objects.

In this way, in the processing step S4 shown in FIG. 6 as described above, when it is judged whether or not the processing executed by dependence judgment unit 53 in the intercommunication control apparatus 2 is defined in the dependence database 55, the following result occurs: in this step, the information identifying individual simulator 3b related to the bird objects is stored in the notification database, and hence all the information contained in the key of the depth defining entry is stored in the notification database. Then, the intercommunication control apparatus 2 directs the individual simulator 3c managing the fish objects to define the information of the depth D as D=d (d>0).

The individual simulator 3c that has received this direction defines the information of the depth D as d and examines whether or not there are any fish objects located in the range from the surface of the pond to the defined depth D=d. Here, if there are such fish objects, the fish objects are assigned to the notification target to send and notify, for example, the information (the identifiers of the fish objects) identifying the fish objects as the notification target and the information of the position thereof to intercommunication control apparatus 2.

The intercommunication control apparatus 2 receives the notified information to add to and stores in the notification database by relating the information specifying individual simulator 3c with the notified information. Then, dependence judgment unit 53 in the intercommunication control apparatus 2 judges whether or not the processing to be executed is defined in the dependence database 55. In this step, the information identifying both the individual simulator 3b and 3c are stored in the notification database, and thus the processing of S10 and the following steps shown in FIG. 6 and related to the predation-related entry are executed and the fish objects information stored in the notification database is sent to individual simulator 3b to execute the processing of judging the execution of predation.

Here, in order to simplify the description, the presented example contains the dependence database 55 storing the dependence entry related to the predation relationship between birds and fish. However, the dependence entry is not restricted to this and, for example, as a dependence relationship between human objects and vehicle objects, the parameter setting of the collision judgment and a freeing action (a vehicle object stops until human objects go away) may be carried out.

In addition, according to the present embodiment, the user terminal 1 obtains the information about objects belonging to the visual field from the user objects to display for each of predetermined timings. In other words, a user's visual field display unit 42 of the user terminal 1 sends the information related to the user's visual field (information expressing the region in the visual virtual space defining the user's visual field) to the intercommunication control apparatus 2.

The search processing unit 52 in the intercommunication control apparatus 2 sends out the information related to the user's visual field defined by the information received from this user terminal 1 to each of the individual simulators 3 to make each of the individual simulators 3 carry out the object search processing. Each of the individual simulators 3 sends out the list of objects contained in the region (the user's visual field range) designated by the intercommunication control apparatus 2. In this object list, the information defining an external appearance of objects and the information related to the positions of objects are included.

The intercommunication control apparatus 2 sends out the object list received from each of individual simulators 3 to the user terminal 1. In this way, the user terminal 1 receives the information of other objects (other than the user objects) contained in the user's visual field range from intercommunication control apparatus 2, generates an image indicating the received objects, for example, and displays the image on a display or other device.

If it is assumed that the user terminal 1 obtains and displays the information about the position of each object for each single step of the simulation, when a number of objects increases, the communication load thereof increases. Hence, the user terminal 1 may obtain the information on the objects belonging to the visual field range from the user objects at a synchronizing timing defined on the basis of the predetermined timing determination rule. On this occasion, the user terminal 1, at a point in time other than the synchronizing timing, predicts the behavior such as the position of objects at the point of the display on the basis of the information on the objects last received to display the result.

Figure 5:
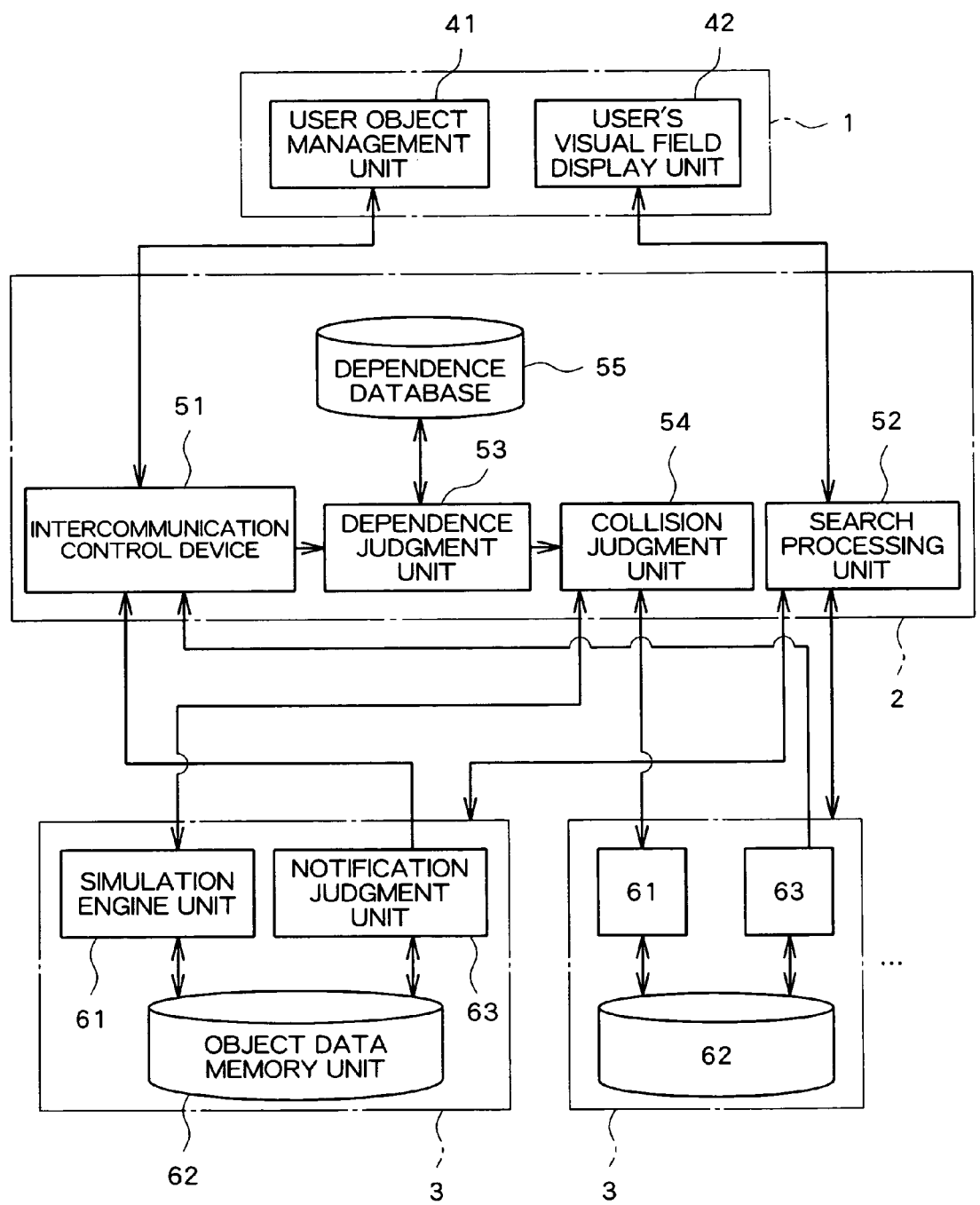
FIG. 5 is a functional block diagram showing an example of a simulation system according to the embodiment of the present invention.
Figure 7:
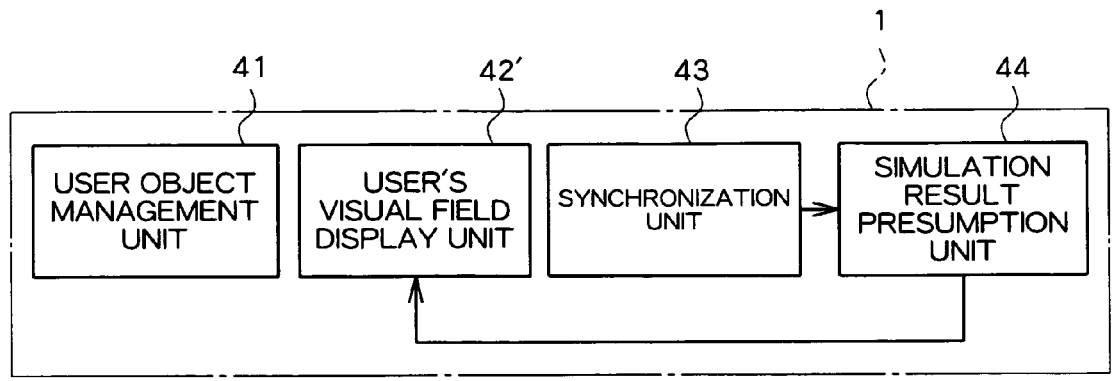
FIG. 7 is a functional block diagram showing another example of a user terminal of the simulation system according to the embodiment of the present invention.

In this example, user terminal 1, as shown in FIG. 7 replacing the example shown in FIG. 5, functionally contains a user object management unit 41, a user's visual field display unit 42', a synchronization unit 43, and a simulation result prediction unit 44.

The user's visual field display unit 42' indicates the information of the objects contained in the visual field range as a list of objects, which is located in the user's visual field range, on the display on the basis of the information of predicting the simulation result (object prediction information) stored in the memory, not illustrated.

The synchronization unit 43 defines the synchronization timing on the basis of the predetermined timing determination rule and, in the synchronization timing, sends the request of the information of the objects contained in the visual field range to intercommunication control apparatus 2 accompanied with the information defining the user's visual field range. Then, when the information of other objects contained in the visual field range has been received from intercommunication control apparatus 2, the user terminal 1 stores the information in the work memory.

The simulation result prediction unit 44 uses the information of the objects, which is stored in the work memory by the synchronization unit 43, for each time concerning one step of the simulation to predict the behavior (result of the simulation) of each object. Then, the simulation result prediction unit 44 updates the information (prediction information) of the objects stored in the work memory.

Here, the simulation result prediction unit 44, for example, carries out the prediction of the information such as the position of the object correcting a predicted value by using a Kalman filter according to an actual simulation result obtained by synchronization unit 43.

Predicting and indicating the position of other objects by the user terminal 1 as described above makes always obtaining the position of other objects unnecessary, resulting in reduced communication load.

Some individual simulators 3 use the position of the user objects to simulate the behavior of the assigned object. For example, if there are individual simulators 3 assigned to such objects as a user's pet, the position of the pet requires to be simulated according to the position of the user objects.

Then, individual simulators 3 notify the designation of providing the information of the position of the user objects to the user terminal 1. The user terminal 1 then sends the information of the user objects to individual simulators 3 as the source of the notification. Also in this case, it is possible for the information of the user objects to not be sent for each one step of the simulation, but for the information of the user objects to be sent only at the synchronization timing defined based on the predetermined timing determination rule.

Individual simulators 3 receiving the information of the user objects, in this case, store the information of the user objects, which is received at the synchronization timing, in the memory unit 22, predicts the position of moved user objects on the basis of stored information in steps other than the synchronization timing, and simulates the behavior of the objects on the basis of the result of the prediction. Prediction of the position of the moved user objects in this case also can be carried out by using, for example, a Kalman filter.

In these examples, the timing determination rule to determine the synchronization timing can be determined, for example, according to a passed time following the last synchronized time, a speed of the moving user object, or the speed of the other moving objects. For example, the synchronization timing can be determined at specified regular intervals once the last synchronization time has been reached. In this case, synchronization is performed at a specific interval. On the other hand, as the speed of the moving user object and the speed of the other moving objects becomes higher, the specified interval as a time threshold can be set shorter.

In addition, the synchronization timing may be defined by the intercommunication control apparatus 2. In this example the intercommunication control apparatus 2 uses the information in the user's visual field range, which is received from the user terminal 1, to query whether or not there are objects located in the visual field range of each of the individual simulators 3.

Each of the individual simulators 3 judges whether or not there are objects located in the designated visual field range, and when there are objects located in the visual field range sends the information to the intercommunication control apparatus 2. The intercommunication control apparatus 2 stores the list of the information identifying each of the individual simulators 3 that sent an answer indicating that there are objects located in the visual field range. This list of information (hereinafter called target simulator list) is updated at predetermined timing, for example, periodically.

The intercommunication control apparatus 2 initially (at the initiation time) requests the information of the objects located in the visual field range from all individual simulators 3 identified by the stored list information (the search processing as described above). Then, the list of objects sent from each of the individual simulators 3 is obtained and sent to the user terminal 1.

On the other hand, if there is an individual simulator 3 added newly to the target simulator list, the intercommunication control apparatus 2 requests the information of the objects located in the visual field range of the user's objects from each of the newly added individual simulators 3 (the search processing as described above). Then, the list of objects sent by each of the individual simulators 3 is obtained and sent to the user terminal 1.

The intercommunication control apparatus 2, when receiving the information of the objects from each of the individual simulators 3 in this way, obtains time stamp information expressing the point in time when the information was obtained from a clock unit (not illustrated) to store an information amount received from each of the individual simulators 3 and the time stamp information in the memory unit 22 by relating to the information identifying each of the individual simulators 3 as a received data amount database.

When the display is updated, the user terminal 1 sends out the signal (display update signal) expressing the update to the intercommunication control apparatus 2.

When the display update signal is received from the user terminal 1, the intercommunication control apparatus 2 examines the time (sufficient lead time) until computing the position of the object in the next step is completed, after individual simulators 3 carry out the simulation.

Then, the amount of information obtainable within a sufficient lead time is computed as an obtainable data amount. The intercommunication control apparatus 2 refers to the received data amount database stored in the memory unit 22 and tentatively selects the information identifying the individual simulators 3, which is related to the information amount less than the computed obtainable data amount and contained in the target simulator list.

Then, among the information identifying tentatively selected individual simulators 3, one piece of information identifying individual simulators 3, which is related to the oldest time stamp information, is selected. If there are a plurality of information pieces identifying individual simulators 3, which are related to the oldest time stamp information, one of them may be randomly selected.

In the intercommunication control apparatus 2, in the case where the processing registered in the dependence entry in the dependence database 55 is conducted, when the information (or, the information identifying the objects related to a plurality of individual simulators 3) identifying the plurality of individual simulators 3 is contained in the dependence entry, the result of the processing registered in the dependence entry is required to be simultaneously informed to the plurality of individual simulators 3. This is because if this is not done, there is a possibility of a conflict occurring in the result of the simulation indicated in the user terminal 1.

Then, in such a case, the following step is applied not only to the information amount of each of the individual simulators 3, but also to individual simulators 3 necessary for the simultaneous synchronization. The intercommunication control apparatus 2 obtains the value of the information amount registered in a received data amount database in relation to each of the individual simulators 3 belonging to the group, sums values of the information amount recorded in relation to each of the individual simulators 3 belonging to the group, and computes the value of the information amount of the whole of the group. Then, the intercommunication control apparatus 2 stores the value of the information amount of the whole of the group, which is computed for the group, in the received data amount database in relation to the information (for example, the list of the information identifying individual simulators 3 belonging to the group) identifying the group.

The intercommunication control apparatus 2 computes the information amount obtainable within the sufficient lead time as the obtainable data amount. Then, the intercommunication control apparatus 2 refers to the received data amount database stored in the memory unit 22, and tentatively selects the information, which is related to the information amount less than the computed obtainable data amount, and also identifies individual simulators 3 contained in the target simulator list or the information which identifies the group.

Subsequently, the intercommunication control apparatus 2 selects any one of the information identifying individual simulators 3 tentatively selected or the information identifying the group according to the predetermined condition. In this selection processing, the intercommunication control apparatus 2 finds, for example, the oldest one among the time stamp information related to each of the individual simulators 3 belonging to each group. Then, the intercommunication control apparatus 2 selects the information identifying individual simulators 3 or the information identifying the group containing individual simulators 3 that are related to the found oldest time stamp information. Otherwise, the condition of this selection may be the condition for randomly selecting one of the information identifying individual simulators 3 among tentatively selected individual simulators 3 or the group.

As a result, synchronization for every group becomes possible to enable prevention of the conflict in the result of the simulation indicated in user terminal 1.

The intercommunication control apparatus 2 requests the information of the objects located in the visual field range of the user's objects from the individual simulators 3 identified by the finally selected information (search processing as described above). Then, the list of the objects sent from the individual simulators 3 is obtained and sent to user terminal 1. Then, the intercommunication control apparatus 2 obtains the time stamp information expressing the point in time where the information was obtained, from the clock unit (not illustrated) and stores the information amount received from finally selected individual simulators 3 as described above, and the time stamp information, by relating to the information identifying individual simulators 3 to update the content of the received data amount database.

On the other hand, when the user terminal 1 receives simulation result information of the objects from the intercommunication control apparatus 2, the user terminal 1 decides that the synchronization timing is approaching, and sends out the information of the user objects to the intercommunication control apparatus 2 every time the information related to the simulation result is received.

Moreover, it is possible that when sending out the object list to the intercommunication control apparatus 2, individual simulators 3 may additionally send out the information such as the position of the user objects predicted in individual simulators 3. The intercommunication control apparatus 2 sends out the predicted information of the received user objects to the user terminal 1, and the user terminal 1 compares this predicted information with the user object information actually changed by a user's operation and, for example, when the predicted position differs from a real position in a predetermined threshold value or more, sends out the user object information to the intercommunication control apparatus 2.

The intercommunication control apparatus 2 sends out the received user object information to finally selected individual simulators 3. Individual simulators 3 that have received the user object information store the user object information in the memory unit 22 to use for the subsequent simulation.

Figure 8:
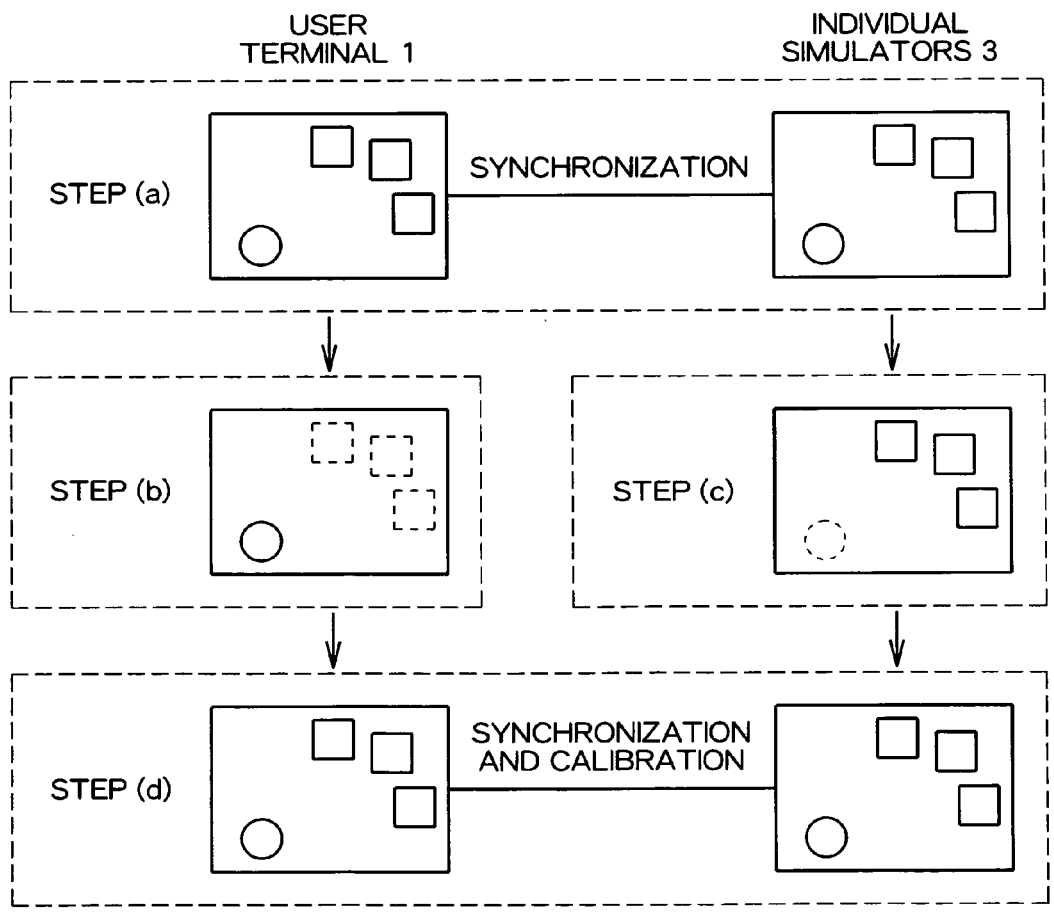
FIG. 8 is a graphical illustration showing another operation example of the simulation system according to the embodiment of the present invention.

According to this example, the user terminal 1 synchronizes with individual simulators 3 selected by intercommunication control apparatus 2 at the time interval (Step (a) in FIG. 8). In addition, user terminal 1 carries out display predicting the movement of the objects obtained in the final synchronization (step (b) in FIG. 8). Moreover, individual simulators 3 predict the movement of the user objects to simulate the behavior of the objects (step (c) in FIG. 8). Then, when the synchronization such as for the position of the objects is done, each of the terminal 1 and the individual simulators 3, corrects the result of the prediction on the basis of the information received from others and the user object information (step (d) in FIG. 8). As a result of this step, performing the synchronization for every step becomes unnecessary, resulting in reduction of the communication load.

In the description so far given, it is assumed that the information of the objects (including the information of the user object) is sent and received via the intercommunication control apparatus 2. However, the information of the objects may be sent and received directly between the terminal 1 and individual simulators 3.

Figure 9:
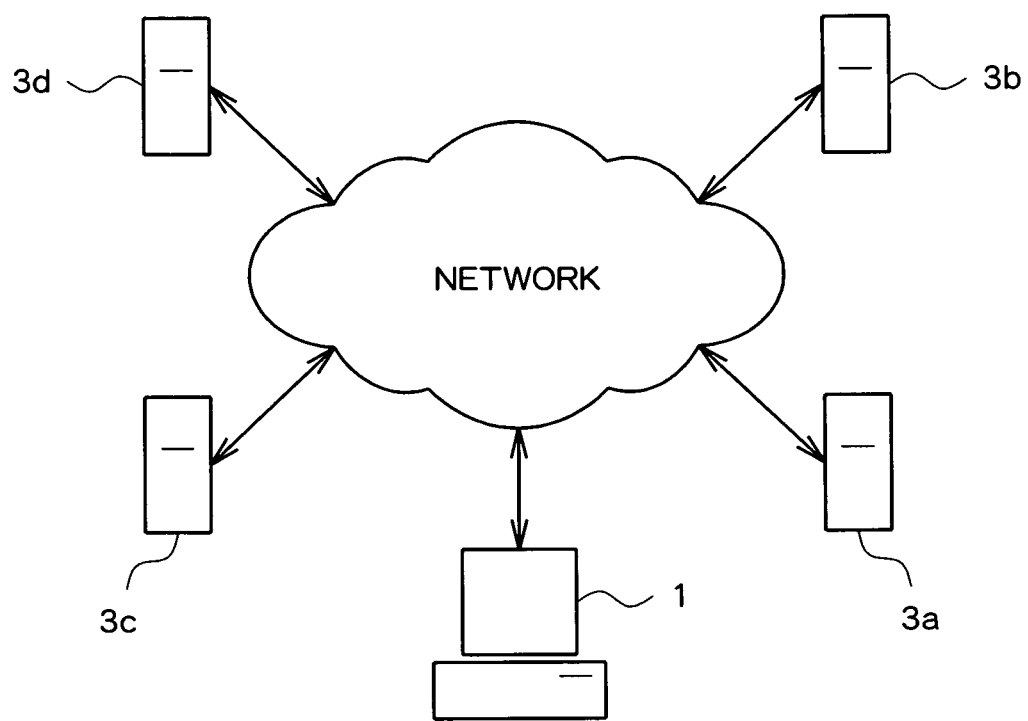
FIG. 9 is a constitutional block diagram showing the simulation system according to an aspect of the embodiment of the present invention.

Next, the simulation system related to another aspect of the embodiment will described according to the present invention. This simulation system related to another aspect, as shown in FIG. 9, includes a terminal 1 and the plurality of individual simulators 3. These are connected to each other via the network.

This aspect functionally comprises, similar to that shown in FIG. 7, a user object management unit 41, user's visual field display unit 42', synchronization unit 43, and simulation result prediction unit 44.

In this example, synchronization unit 43 defines the synchronization timing on the basis of the predetermined timing determination rule, sends the request for the information defining the user's visual field range and the information of the objects contained in the visual field range to each of the individual simulators 3 at the synchronization timing, and receives the information of other objects, which are contained in the visual field range, from each of the individual simulators 3 to store in the memory.

On the other hand, the simulation result prediction unit 44 uses the information of the objects, which is stored in the memory by the synchronization unit 43, for each time concerning one step of the simulation to predict the behavior (result of the simulation) of each object, and updates the prediction information of the objects stored in the memory.

In this step, simulation result prediction unit 44 uses, for example, the Kalman filter, for calibrating the predicted value according to the actual simulation result obtained by the synchronization unit 43 to predict the information of the position of the object.

In this way, predicting and displaying the position of other objects by the user terminal 1 makes always obtaining the information of the position of other objects unnecessary, resulting in the possibility of reducing the communication load.

Individual simulators 3 using the information of the user objects notify the direction of providing the information of the position of other objects to the user terminal 1. The user terminal 1 then send out the information of the user objects directly to individual simulators 3 as the source of the notification.

Also in this case, it is possible for the information of the user objects to not be sent for each single step of the simulation, but for the information of the user objects to be sent only at the synchronization timing defined based on the predetermined timing determination rule. In this case, individual simulators 3 store the information of the user objects, which is received in the synchronization timing, in the memory unit 22, predict the position of moved user objects on the basis of stored information in steps other than the synchronization timing, and simulate the behavior of the objects on the basis of the result of the prediction. Prediction of the position of the moved user objects in this case also can be carried out by, for example, using a Kalman filter.

In these examples, the timing determination rule to determine the synchronization timing can be determined, for example, according to a passed time following the last synchronized time, a speed of the moving user object, or the speed of the other moving objects. For example, the synchronization timing can be determined as specified regular intervals once the last synchronization time has been reached. In this case, synchronization is performed at a specific interval. On the other hand, as the speed of the moving user object and the speed of the other moving objects become higher, the specified interval as a time threshold can be set shorter.

In addition, in the synchronization timing, the synchronization is not always performed among all individual simulators 3. For example, user terminal 1 uses the information of the objects located in the visual field range of the user's objects to query whether or not there are the objects located in the visual field range to each of individual simulators 3.

Each of the individual simulators 3 judges whether or not there are objects located in the designated visual field range and sends out the information to user terminal 1 when there are objects located in the visual field range. User terminal 1 stores the list of the information identifying each of the individual simulators 3 that sent an answer indication that there are objects located in the visual field range. This list of information (hereinafter called target simulator list) is updated at the predetermined timing, for example, periodically.

User terminal 1 requests, in the initial stage (at the time of initialization) the information of the objects located in the visual field range to all individual simulators 3 identified by the stored list information. Then, each of the individual simulators 3 generates the list of the objects located in the visual field range of the user's objects to send to the user terminal 1.

User terminal 1 requests, if there are individual simulators 3 to be newly added to the target simulator list, the information of the objects located in the visual field range to newly added individual simulators 3 (the search processing as described above). Then, individual simulators 3 generate the list of the objects located in the visual field range of the user's objects to send to the user terminal 1.

When receiving the information of the objects from the individual simulators 3 in this way, the user terminal 1 obtains the time stamp information expressing the point in time when the information was obtained from the clock unit (not illustrated), and stores the information amount received from each of individual simulators 3 and the time stamp information as the received data amount database in relation to the information specifying each individual simulator 3.

The user terminal 1 calculates a sufficient lead time from the synchronization timing to the time when the computation of positions of objects in the next step, by the simulation in the individual simulators 3, is completed. Then, the information amount obtainable in the sufficient lead time is computed as an obtainable data amount.

The user terminal 1 refers to the stored received data amount database and tentatively selects the information, which is related to the information amount less than the computed obtainable data amount, and specifying an individual simulator 3 contained in the target simulator list.

Then, among the information identifying individual simulators 3 tentatively selected, one of the information identifying individual simulators 3 related to the oldest time stamp information is selected. If there are a plurality of pieces of information identifying individual simulators 3 related to the oldest time stamp information, one of them may be randomly selected.

The user terminal 1 requests the information of the objects located in the visual field range of the user objects from individual simulators 3 identified by the finally selected information. Then, the list of the objects sent by individual simulators 3 is obtained. Next, the user terminal 1 obtains from the clock unit (not illustrated) the time stamp information which expresses the time when the list was received. Then the user terminal 1 stores the information amount, which is received from the finally selected individual simulators 3 as described above, and the time stamp information in a related manner, and updates the content of the received data amount database.

The user terminal 1 decides that the synchronization timing has come at every time the information which is related to the simulation result of the object is received from at least one individual simulator 3. When the user terminal 1 decides that the synchronization timing has come, the user terminal 1 sends the information of the user objects to individual simulators 3 as the source of the received information.

It is possible that when sending out the object list to the intercommunication control apparatus 2, individual simulators 3 may additionally send out the information such as the position of the user objects predicted in individual simulators 3. User terminal 1 compares this predicted information with the user object information actually changed by a user's operation and, for example, when the difference between predicted position and the real position exceeds a predetermined threshold, the user terminal 1 sends out the user object information to individual simulators 3.

Individual simulators 3 that have received the user object information store the user object information in the memory unit 22 for use in the subsequent simulation.

According to this example, user terminal 1 synchronizes with individual simulators 3 selected by the user terminal 1 at a time interval (Step (a) in FIG. 8). In addition, user terminal 1 carries out display predicting the movement of the objects obtained in the final synchronization (step (b) in FIG. 8). Moreover, individual simulators 3 predict the movement of the user objects to simulate the behavior of the objects (step (c) in FIG. 8). Then, when the synchronization is conducted between the terminal 1 and individual simulators 3, each of the user terminal 1 and the individual simulators 3 corrects the result of their prediction on the basis of the information received from others and the user object information (step (d) in FIG. 8). As a result of this step, performing the synchronization for every step becomes unnecessary, resulting in reduction of the communication load.

In addition, in the description given so far, the description has been given for the example in which the user terminal 1, intercommunication control apparatus 2, and individual simulators 3 are achieved by separate computer devices and connected to each other via the network. However, the embodiments of the present invention are not restricted to these examples. For example, the user terminal 1, intercommunication control apparatus 2, and individual simulators 3 may be constituted by a single integral computer device. On the other hand, in another example, the intercommunication control apparatus 2 and individual simulators 3 are constituted in the single integral computer device to connect to the user terminal 1. At this time, the control unit 21 and control unit 31, memory unit 22 and memory unit 32, and communication unit 23 and communication unit 33 may be shared in a computer device or may be made as separate hardware (for example, in case of a multiprocessor, the control unit 21 and control unit 31 can be separately made as 2 processors). On the other hand, in the case where the user terminal 1, intercommunication control apparatus 2, and individual simulators 3 are constituted in the single integral computer device, the program to drive the processor as each of the user terminal 1, intercommunication control apparatus 2, and individual simulators 3 is stored in the memory unit 22 and memory unit 32 as the computer readable memory medium. Similarly, in the case where the intercommunication control apparatus 2 and individual simulators 3 are constituted in the single integral computer device, the program to drive the processor as each of the user terminal 1, intercommunication control apparatus 2, and individual simulators 3 is stored in the memory unit 22 and memory unit 32 as the computer readable memory medium.

In these cases, the computer device achieving intercommunication control apparatus 2 and individual simulators 3 performs the process as intercommunication control apparatus 2 and the plurality of processes as individual simulators 3 in parallel. Meanwhile, when the user terminal 1 is achieved in the single integral computer device, the process as the user terminal 1 is executed in parallel. This parallel operation can be employed by various methods and, for a computer device having the plurality of processors (program control device), can be achieved in various constitutions, such as an aspect in which a virtual network connects between a cluster system, grid, and each processor.

As described above, ether in the case where the user terminal 1, intercommunication control apparatus 2, and individual simulators 3 are constituted in the single integral computer device, or in the case where the intercommunication control apparatus 2 and individual simulators 3 are constituted in the single integral computer device, and the user terminal 1 is communicably connected, the single integral computer device will work as follows.

The single integral computer device carries out an examination process for finding objects as the notification target in the process as individual simulators 3.

If there are notification target objects, the single integral computer device outputs the information of the objects to the process as the intercommunication control apparatus 2. As the process of the intercommunication control apparatus 2, the single computer device receives the information of the objects, records the information of each of the objects in relation of the information (such as an execution process ID of the program) identifying individual simulators 3 outputted the information of each of the objects, refers to the recorded information and the dependence database to examine whether or not there is any processing to execute, and if there is any processing to be executed, executes the processing and relates the result to the processing to output to the process as individual simulators 3 recorded in the dependence database in relation to the processing.

In these cases, the plurality of individual simulators 3 managed by the intercommunication control apparatus 2 may be partially executed by another computer device via the network. In this case, the information concerning objects is received from another computer device and held in the program to work as an intercommunication control apparatus 2 and this program contains a program module used for the judgment of the dependence relationship and the program module concerning the processing for sending the result of the processing concerning the dependence relationship to another computer device.

While the present invention is described in terms of preferred or exemplary embodiments, it is not limited hereto.

What is claimed is:

1. A simulator system comprising:
    a first simulator simulating a behavior, including movement in a virtual space, of a plurality of simulation targets of a first kind,
    a second simulator simulating a behavior, including movement in the virtual space, of a simulation target of a second kind,
    wherein the first kind of simulation targets are different from the second kind of simulation target,
    and an intercommunication control device connected via a network to each of the simulators,
    wherein:
    each of said simulators comprises a selective notification device to select one or more of the predetermined simulation targets located in a predetermined region of the virtual space that satisfy a predetermined notification condition and to send information related to the one or more selected simulation targets, excluding others of the predetermined simulation targets not located in the predetermined region of the virtual space, to the intercommunication control device via the network, said predetermined notification condition including a possibility of carrying out one or more mutual actions with another of the predetermined simulation targets simulated by another of said simulators,
    the intercommunication control device comprises:
    a holding device for holding processing designation information to designate a processing content to be executed when information related to the simulating targets is received from the simulators via the network identified by the information in relation to information identifying at least one simulator, said processing content including one or more judgment conditions showing whether or not there are mutual actions between two or more of the simulation targets related to which information is received from the corresponding simulators via the network, and a mutual processing execution device for executing processing of the content predetermined by the processing designation information on the basis of the information related to the simulation targets received from each of the simulators via the network, the processing including judging whether or not there are mutual actions between the simulation targets related to which information is received from the corresponding simulators, and notifying the result of the processing to the simulators via the network.

2. The simulator system according to claim 1, wherein:

the processing designation information contains information designating the individual simulator and information of the notification condition to be defined for the individual simulator designated by the processing designation information, the mutual processing execution device sets the notification condition for the designated individual simulator and executes processing of the content determined by the processing designation information on the basis of the information related to the simulating targets, notified selectively on the basis of the set notification condition.

3. The simulator system according to claim 1, wherein said second simulator simulates a plurality of target objects.

4. The simulator system according to claim 3, wherein said first simulator only simulates said first kind of simulation target and said second simulator only simulates said second kind of simulation target.

5. The simulator system according to claim 1, wherein said first simulator is further configured to receive collision information from said intercommunication control device and determine an outcome of a collision and send a result of said collision outcome to said intercommunication control device.

6. The simulator system according to claim 5, wherein said intercommunication control device is configured to receive outcome information from said first simulator and notify said second simulator of said outcome information.

7. An intercommunication control device connected via a network to a first simulator simulating a behavior, including movement in a virtual al space, of a plurality of simulation targets of a first kind, and a second simulator simulating a behavior, including movement in the virtual space, of a simulation target of a second kind, wherein the first kind of simulation targets are different form the second kind of simulation targets, said intercommunication control device comprising:

a holding device for holding processing designation information to designate processing content to be executed when information related to the simulating targets is received from the simulators via the network identified by the information in relation to information identifying at least one simulator, said processing content including one or more judgment conditions showing whether or not there are mutual actions between two or more of the simulation targets located in a predetermined region of the virtual space related to which information is received from the corresponding simulators via the network, and a mutual processing execution device, on receiving the information related to one or more of the simulation targets located in the predetermined region satisfying a predetermined notification condition, including a possibility of carrying out one or more mutual actions with another of the simulation targets, from the corresponding simulators via the network, stores the information related to the simulation targets, for executing the processing of the content determined by the processing designation information on the basis of the information related to the simulation targets received from each of the simulators via the network, the processing including judging whether or not there are mutual actions between the simulation targets related to which information is received from the corresponding simulators via the network, and notifying the result of the execution to the simulators via the network.

8. The intercommunication control device according to claim 7, the processing designation information contains the information to designate the simulators and information of the notification condition to be set for the simulators designated by the processing designation information, and said intercommunication control device sets the notification condition for the designated simulators and executes the processing of the content determined by the processing designation information on the basis of the information related to the simulation target notified selectively on the basis of the set notification condition.

9. A non-transitory computer readable memory medium storing a program with instructions for execution by a computer, said instructions embodied in respective modules comprising:

a first module for making the computer function as a first simulator simulating a behavior, including movement in a virtual space, of a plurality of simulation targets of a first kind, and a second simulator a behavior, including movement in the virtual space, of a simulation target of a second kind, wherein the first kind of simulation targets are different from the second kind of simulation targets; and a second module for making the computer function as an intercommunication control device connected via a network to each of the simulators, in an operation as each of the simulators, selecting one or more of the predetermined simulation targets located in a predetermined region of the virtual space satisfying a predetermined notification condition, and outputting information related to the one or more selected simulation targets, excluding others of the predetermined simulation targets not located in the predetermined region of the virtual space, to the intercommunication control device via the network, said predetermined notification condition including a possibility of carrying out one or more mutual actions with another of the predetermined simulating targets simulated by another of the simulators;

in an operation as the intercommunication control device, holding processing designation information to designate processing content to be executed on receiving input of the information related to the simulation target from individual simulators via the network identified by the information, by relating to the information identifying at least one simulator, said processing content including one or more judgment conditions showing whether or not there are mutual actions between two or more of the simulation targets related to which information is received from the corresponding simulators via the network, and executing processing of the content determined by the processing designation information on the basis of the information related to the simulation targets inputted from each of the simulators via the network, the processing including judging whether or not there are mutual actions between the simulation targets related to which information is received from the corresponding simulators via the network, to notify the result of the execution to the simulators via the network.

10. A simulator system comprising at least one individual simulator simulating behavior, including movement in virtual space of a corresponding predetermined simulation target, and a user terminal to determine the behavior of user objects according to designation inputted from a user,
wherein
said user terminal comprises:
a device for obtaining behavior information of the simulation target from the at least one individual simulator only at each of the synchronization timings, which are determined on the basis of a predetermined timing determination rule,
a device for forecasting the behavior of the simulation target on the basis of previously-obtained behavior information for the simulation target in between the synchronization timings and for correcting a result of the forecasting at the each synchronization timing to coincide with the obtained information of the simulation target, and
a device for showing the result of the forecasting to the user in between the synchronization timings and showing the result of the correction at the synchronization timings.

11. The simulator system according to claim 10, wherein said user terminal sends the information of the user objects to the at least one individual simulator at the synchronization timing, and each of said at least one individual simulator further comprises:
a device for forecasting the behavior of the user objects on the basis of the previously-obtained user object information at a point other than the synchronization timing; and
a device for simulating the behavior of the simulation target by using the result of the forecasting.

12. The simulator system according to claim 10,
further comprising an intercommunication control device connected to each of the at least one individual simulator and the user terminal,
wherein
the intercommunication control device comprises:
a device for selecting at least one of said at least one individual simulator as a synchronization target, and determining the timing of synchronization with the synchronization target based on a predetermined timing determination rule; and a device for notifying the at least one individual simulator as the synchronization target and the synchronization timing to said user terminal.

13. The simulator system according to claim 12,
in the timing determination rule, a rule for assigning a plurality of individual simulators to simultaneous synchronization objects is included and, when the plurality of individual simulators become simultaneous synchronization objects according to the rule, the user terminal obtains the information of the simulation target from each of the plurality of individual simulators that became the synchronization target.

14. A non-transitory computer readable memory medium storing a program with instructions for execution by a computer that make the computer function as a user terminal to communicate with individual simulators simulating behavior, including movement in virtual space of a predetermined simulation target, said instructions embodied in respective modules comprising:
a user input module prompting and accepting input from a user and using said input to determine a behavior of user objects;
a module for obtaining behavior information of a simulation target from the individual simulators at each of synchronization timings determined on the basis of a predetermined timing determination rule;
a module for forecasting the behavior of the simulation target on the basis of previously-obtained behavior information of the simulation target in between the synchronization timings and for correcting a result of the forecasting at the each synchronization timing to coincide with the obtained behavior information of the simulation target; and
a module for showing the result of the forecasting to the user in between the synchronization timings and showing the result of the correction at the synchronization timings.

15. The simulator system according to claim 12, wherein the intercommunication control device receives the behavior information of the simulation target from each of the individual simulators and sends the received information to the user terminal, and stores information of received data amount by relating to information specifying each of the individual simulators, and
the timing determination rule includes a rule for selecting the individual simulator to be the synchronization target using the stored information of data amount.

* * * * *